(12) United States Patent
Meduri et al.

(10) Patent No.: US 11,055,273 B1
(45) Date of Patent: Jul. 6, 2021

(54) SOFTWARE CONTAINER EVENT MONITORING SYSTEMS

(71) Applicant: Amazon Technologies, Inc., Seattle, WA (US)

(72) Inventors: Kiran Kumar Meduri, Bellevue, WA (US); Marcel Jon van Rensberg, Seattle, WA (US); Fernando Paiva Zandona, Sammamish, WA (US); Jia Bi Zhang, Seattle, WA (US); Mengye Gong, Seattle, WA (US); Anthony Joseph Suarez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 666 days.

(21) Appl. No.: 15/344,395

(22) Filed: Nov. 4, 2016

(51) Int. Cl.
| | | |
|---|---|---|
| *G06F 16/20* | (2019.01) | |
| *G06F 16/23* | (2019.01) | |
| *G06F 16/2458* | (2019.01) | |
| *G06F 16/21* | (2019.01) | |

(52) U.S. Cl.
CPC ........ *G06F 16/2358* (2019.01); *G06F 16/219* (2019.01); *G06F 16/2474* (2019.01)

(58) Field of Classification Search
None
See application file for complete search history.

(56) References Cited

U.S. PATENT DOCUMENTS

| | | | | |
|---|---|---|---|---|
| 7,647,329 | B1* | 1/2010 | Fischman | G06F 3/0607 707/999.1 |
| 2003/0093431 | A1* | 5/2003 | Cooke | G06F 16/273 |
| 2003/0233502 | A1* | 12/2003 | Murotani | G06F 11/0727 710/74 |
| 2010/0146243 | A1* | 6/2010 | Balko | G06F 9/465 712/33 |
| 2013/0060742 | A1* | 3/2013 | Chang | G06F 16/2322 707/704 |
| 2013/0198272 | A1* | 8/2013 | Shionoya | G06F 11/302 709/203 |
| 2014/0082156 | A1* | 3/2014 | Jagtap | G06F 9/5027 709/220 |
| 2015/0254307 | A1* | 9/2015 | Johnson | G06F 16/2425 707/763 |
| 2016/0073059 | A1* | 3/2016 | Bader-Natal | H04N 7/15 348/14.03 |
| 2016/0261716 | A1* | 9/2016 | Khalaf | H04L 67/1002 |

\* cited by examiner

*Primary Examiner* — Jau Shya Meng
(74) *Attorney, Agent, or Firm* — Davis Wright Tremaine LLP

(57) ABSTRACT

An event applier service obtains state change information for a plurality of software containers from a transaction journal. Based at least in part on operations specified in the state change information for the plurality of software containers, the event applier service generates event data for the plurality of containers. The event applier service updates a database to indicate that the state change information has been processed to generate the event data. The event applier service provides the event data.

20 Claims, 9 Drawing Sheets

SOFTWARE CONTAINER EVENT MONITORING SYSTEMS

BACKGROUND

Companies and individuals seeking to reduce the expense and overhead associated with maintaining their own computing resources have turned instead to purchasing remote computing services, such as remote program execution over multiple virtual machine instances and remote data storage, offered by computing resource service providers to customers. Such remote computing services are often configurable and scalable to meet various computing needs of the customers of the computing resource service provider. However, it can be difficult for a customer to manage various applications running on multiple virtual machine instances and such applications may not be portable to other computing systems or scalable to meet an increased need for resources. Additionally, monitoring performance of these various applications may be difficult and cumbersome for users of these applications and virtual machine instances.

BRIEF DESCRIPTION OF THE DRAWINGS

Various techniques will be described with reference to the drawings, in which.

DETAILED DESCRIPTION

Figure 1:
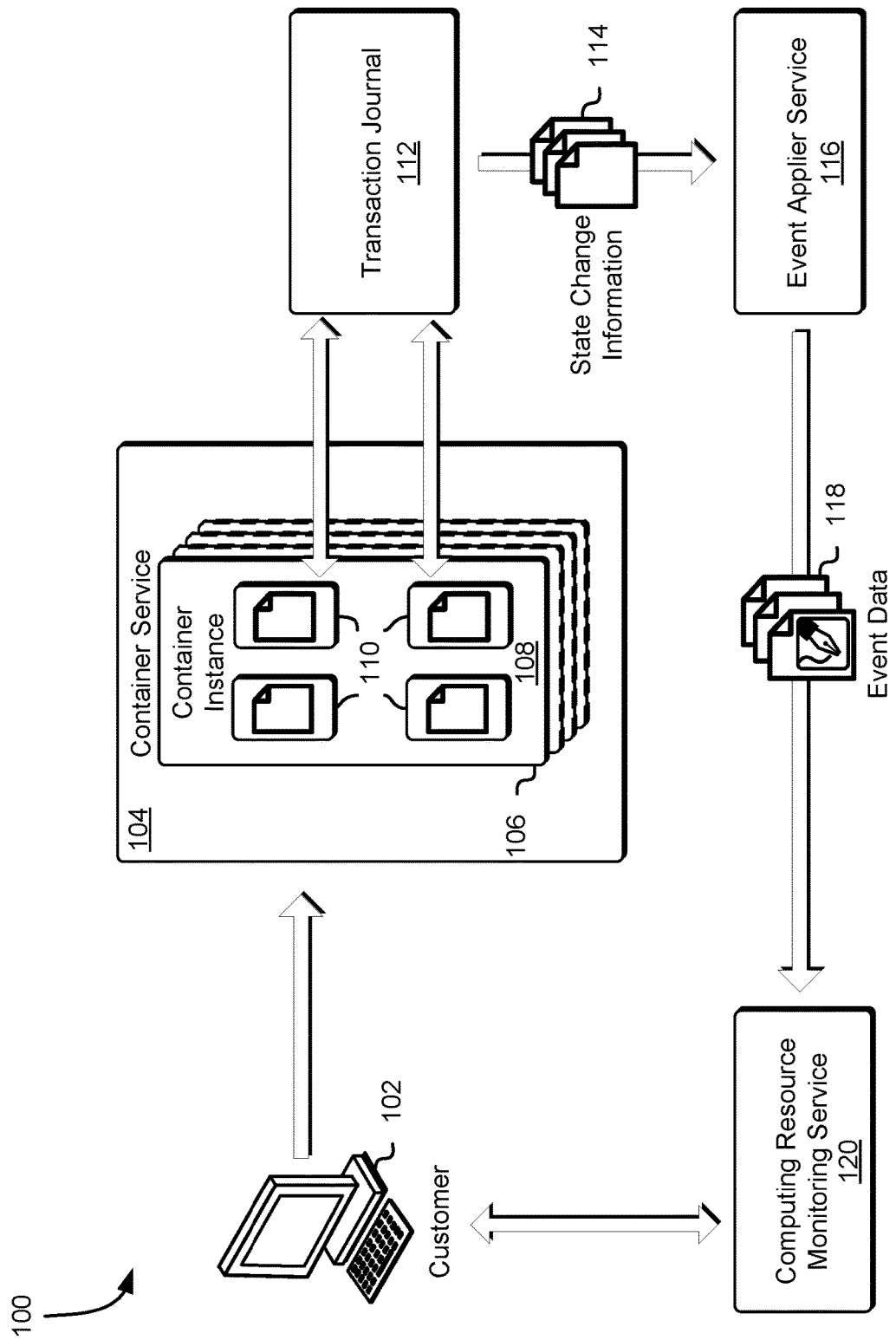
FIG. 1 shows an illustrative example of an environment in which event data is generated based at least in part on state change information for one or more containers in accordance with at least one embodiment.

This disclosure relates to the aggregation of state change information for various software containers to generate event data for these various software containers for customers of a computing resource service provider that provides the software containers as a service. In an example, a customer of a computing resource service provider utilizes one or more software containers provided by the computing resource service provider to initiate compute instances that can be used to perform various jobs on behalf of the customer. These jobs may comprise various operations and processes that need to be performed to support the customer's business needs. As the jobs are initiated, the software containers may transmit state change information to an agent communication service of a container service provided by the computing resource service provider. This agent communication service may transmit the state change information to a transaction journal, which may add the state change information to a sequence of state changes for various software containers. In some examples, the state change information includes a version number that may be used to indicate an ordering of state changes for the corresponding software container.

In some examples, an event applier service evaluates a state information database to determine the state change information previously processed by the event applier service. The event applier service may access the transaction journal to determine whether new state change information is available. If so, the event applier service obtains, from the transaction journal, any newly available state change information for the various containers utilized by the customers of the computing resource service provider to perform jobs on their behalf. The event applier service may add the newly obtained state change information to a state information datastore, wherein the state change information is stored for processing. In an example, the event applier service may provision various worker systems that may parse through the obtained state change information and compile the state change information into event data. The event data may specify the operations performed by a software container over a period of time. Each software container provisioned by the event applier service may access the state information datastore and obtain state change information for various software containers. The worker system may compile the state change information according to each software container. Additionally, the worker system may identify, based on customer identifiers specified in the state change information, methods for transmitting the event data to the customers or to other services provided by the computing resource service provider.

The computing resource service provider may provide a computing resource monitoring service to its customers. The computing resource monitoring service may allow customers to obtain event data for their various resources, including their software containers. In an example, the computing resource monitoring service receives, from the worker systems of the event applier service, event data for various software containers, which the computing resource monitoring service may store within a datastore. Additionally, the computing resource monitoring service may maintain a database to identify the location of event data for the software containers. This database may include an entry for each software container and the entry may specify customers and other entities authorized to obtain event data for the software container. If a customer submits a request to obtain event data for one or more software containers, the computing resource service accesses the database to determine whether there is any event data available that can be used to fulfill the customer's request. If any entries are identified, the computing resource monitoring service may access the datastore to obtain the event data for the customer's containers. The computing resource monitoring service may provide the event data to the customer to fulfill the request. Thus, in response to a request from a customer to obtain event data for its software containers, the computing resource monitoring service may provide the event data without need to access the event applier service.

In this manner, a customer can obtain event data for its software containers through a computing resource monitoring service without need to parse through state change information for its software containers to identify these events. In addition, the techniques described and suggested in this disclosure enable additional technical advantages. For instance, because the state change information and event data may be generated to include a version number, a customer may utilize the version number to identify the latest event data for a particular software container without need to parse through all event data for the software container. Thus, the customer can discard any older event data for the software container and rely on the latest available information to determine the state of its software container.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which event data 118 is generated based at least in part on state change information 114 for one or more containers 110 in accordance with at least one embodiment. In the environment 100, a customer 102 may send a task definition file for software containers 110 along with a request to launch tasks through a network to a container service 104 of a computing resource service provider. A scheduler, such as the scheduler 208 of FIG. 2, may determine into which container instance 108 of a cluster 106 of container instances that the software containers 110 specified in the task definition file should be launched. In some embodiments, the software containers are configured to share resources provided by other services of the computing resource service provider, such as a storage volume provided by a block-level data storage service of the computing resource service provider.

The customer 102 may be an individual associated with a customer account of the container service, or may be an individual, system, resource computing device, or other entity authorized to act on behalf of the individual associated with the customer account. Furthermore, the resources of the customer 102 may be made available to other users. For example, the customer 102 may utilize the container instance 108 to provide an online marketplace for other users, and these other users may then buy and/or sell goods and services through the online marketplace provided by the customer 102 through the container service. The customer 102 may communicate with the container service 104 of the computing resource service provider through the network, which may be a communication network, such as the Internet, an intranet, an internet service provider (ISP) network and/or some other such network.

In some examples, a "task definition" or "task definition file" may refer to file specifying a set of linked containers (i.e., a set of containers that, when running on a host computing system, are associated with each other) that are assigned to start as a group. The task definition file may further specify disk and network locations that the containers 110 are able to share on one or more physical machines. The task definition file may be utilized for launching the set of containers 110. In some implementations, the task definition file may define and link containers 110 spread across multiple physical machines. One task definition file may contain and schedule many tasks. In some examples, a "task" may refer to an instantiation of a task definition file, and may consist of one or more containers 110. Tasks may be modified by applying a new task definition to the task. The task definition file may contain all the information needed to place containers 110 in a cluster 106, and the cluster 106 may be managed through application programming interface calls.

The container service 104 may be a service provided by the computing resource service provider to allow the customer 102 to execute the containers 110 within the cluster 106. The container service 104 may be similar to the container service 201 described in conjunction with FIG. 2. The computing resource service provider may provide one or more computing resource services to its customers individually or as a combination of services of a distributed computer system. The one or more computing resource services of the computing resource service provider may be accessible over the network and may include services such as an event applier service 116, a computing resource monitoring service 120, virtual computer system services, block-level data storage services, cryptography services, on-demand data storage services, notification services, authentication services, policy management services, task services and/or other such services. Not all embodiments described include all of the services described and additional services may be provided in addition to, or as an alternative to, services explicitly described.

In some examples, a "container instance" may refer to a computer system instance (virtual or non-virtual, such as a physical computer system running an operating system) that is configured to launch and run software containers. Thus, the container instance 108 may be configured to run the containers 110 in accordance with the task definition file provided by the customer 102. One or more container instances may comprise a cluster. In some examples, "cluster" may refer to set of one or more container instances that have been registered to (i.e., as being associated with) the cluster. Thus, the container instance 108 may be one of many different container instances registered to the cluster 106, and the other container instances of the cluster 106 may be configured to run the same or different types of containers as the containers 110. The container instances within the cluster may be of different instance types or of the same instance type, and the customer 102 may have more than one cluster. Thus, the customer 102 may launch one or more clusters and then manage user and application isolation of the containers 110 within each cluster through application programming interface calls. Further detail about clusters may be found in the description of FIG. 2.

A container (also referred to as a software container or isolated user space instance) may be a virtualization instance running under a computer system instance that includes programs, data, and system libraries. When the container is run, the running program (i.e., the process or set of processes) is isolated from other processes running in the same computer system instance. Thus, the containers 110 may each run on an operating system (e.g., using memory, CPU, and storage allocated by the operating system) an operating system of the container instance 108 and execute in isolation from each other (e.g., each container may have in isolated view of the file system of the operating system). Each of the containers 110 may have its own namespace, and applications running within the containers 110 are isolated by only having access to resources available within the container namespace. Thus, containers 110 may be an effective way to run one or more single applications within their own namespace. A container encapsulation system allows one or more containers to run within a single operating instance without overhead associated with starting and maintaining virtual machines for running separate user space instances. An example container encapsulation system is the Docker container engine.

The containers 110 may be launched to have only specified resources from resources allocated to the container instance 108; that is, a container may be launched to have a certain amount of memory and to not utilize more than a specified amount of processing power. The resource allocation for the containers 110 may be specified in the task definition file. Multiple containers may run simultaneously on a single host computer or host container instance, and the resources of the host can be allocated efficiently between the containers. In some embodiments, a host may support running containers in container instances from only one customer. In other embodiments, a single host may allow multiple customers to have container instances running on the host. In the latter case, the container service may provide security to ensure that the customers are unable to access containers, clusters, or container instances of the others.

In an embodiment, the container service 104 includes an agent communication service that communicates with container agents running on the container instance 108. The agent communication service may track the status of all agents in a cluster 106, and may push run commands and state changes to its respective instance. In some embodiments, communication by other components of the container service 104, with containers and the container instances 108 is performed through the agent communication service. The agent communication service may transmit state change information for each container 110 and obtained from the agent of each container 110 to a transaction journal 112, which may append a sequence of state changes for containers of the cluster 106 to incorporate the newly obtained state change information. The state change information may specify state transitions for a container 110. For instance, the container agent of the container instance may record, as state change information, a state transition for a container from an idle state to a processing state in response to execution of a task.

It should be noted that while containers and container instances are used extensively throughout the present disclosure for the purpose of illustration, other computing resources and services may be used. For instance, the transaction journal 112 may maintain state change information for other computing resources, such as virtual computer systems, block-level storage devices and volumes, object-based storage devices and volumes, databases, archival storage systems, monitoring systems, notification systems, and other systems, devices, and services provided by a computing resource service provider. Each computing resource may transmit, via an agent or other process, state change information for the computing resource to the transaction journal 112.

The transaction journal 112 may be a replicated state machine implemented using a plurality of replication nodes. Each node of a particular replication transaction journal 112 may be responsible for replicating state change information of at least a particular cluster or container instance, e.g., in the form of state change records written to a local disk or other similar storage device. The state change records may include the sequence of state changes for each container. For instance, a state change record for a container may include the sequence of state changes for the container. Alternatively, the state change records may aggregate the sequence of state changes for various containers, whereby a container identifier may be used to distinguish different sequences of state changes. State change information may be propagated along a set of edges from an acceptor node to a committer node of the transaction journal 112, referred to herein as a replication pathway or a commit pathway. Each state change message propagated within the transaction journal 112 may include a respective sequence number or a logical timestamp that is indicative of an order in which the corresponding state change request was processed (e.g., at an acceptor node). Sequence numbers may be implemented using any of a variety of techniques in different embodiments—e.g., a simple N-bit counter maintained by an acceptor node may be used, or a monotonically increasing logical timestamp value (not necessarily related to a time-of-day clock) generated by an administrative component of the transaction journal 112 such as the transaction journal configuration manager may be used. When a particular state change record reaches a committer node, e.g., after a sufficient number of replicas of the state change record have been saved along a replication pathway, the change may be explicitly or implicitly committed. The state of the application as of a point in time may be determined in some embodiments as a logical accumulation of the results of all the committed state changes up to a selected sequence number. A configuration manager may be responsible for managing changes to the transaction journal configuration (e.g. when nodes leave the transaction journal 112 due to failures, or join/re-join the transaction journal 112) by propagating configuration-delta messages asynchronously to the transaction journal nodes as described below.

In some embodiments, each replication node implements a respective deterministic finite state machine, and the configuration manager may implement another deterministic finite state machine. The protocol used for managing transaction journal 112 configuration changes may be designed to maximize the availability or "liveness" of the transaction journal 112 in various embodiments. For example, the transaction journal 112 nodes may not need to synchronize their views of the transaction journal 112 configuration in at least some embodiments; thus, the protocol used for container state change processing may work correctly even if some of the nodes along a replication pathway have a different view of the current transaction journal 112 configuration than other nodes. The configuration manager of the transaction journal 112 may not need to request the transaction journal 112 nodes to pause processing of state change nodes in at least some embodiments, despite the potentially divergent views of the nodes regarding the current transaction journal 112 configuration. Thus, the types of "stop-the-world" configuration synchronization periods that may be required in some state replication techniques may not be needed when using replication transaction journals of the kind described herein.

In an embodiment, the state change information for the one or more containers 110 specify a version number, which may be used to determine an ordering of state changes for the one or more containers 110. For instance, the agent communication service of the container service 104 may append the state change information destined for the transaction journal 112 with a version number based at least in part on an ordering of state transitions for a software container 110. The agent communication service may track timestamps for each state transition and use these timestamps to determine the version numbers for each state transition specified in the state change information. The transaction journal 112 may maintain these version numbers in its sequence of state changes such that, when the state change information 114 is provided to the event applier service 116, the event applier service 116 may generate event data that specifies the corresponding version number for each event identified based at least in part on the corresponding state transition.

The computing resource service provider may include an event applier service 116 that may access the transaction journal 112 to obtain state change information 114 for the various containers 110 of the clusters 106 maintained by the container service 104. The event applier service 116 may be a service provided by the computing resource service provider that compiles state change information 114 from the transaction journal 112 into event data 118 that may be processed by a computing resource monitoring service 120. In an embodiment, the event applier service 116 maintains a state change database, which may specify what state change information has been obtained by the event applier service 116. The event applier service 116 may access the transaction journal 112 to determine whether there is newly available state change information not specified in the state change database. If so, the event applier service 116 may obtain this new state change information from the transaction journal 112 and update the state change database to specify that the new state change information has been obtained. The event applier service 116 may store the state change information 114 in a state information datastore, where the state change information 114 may be organized according to the container 110 that generated the state change information 114 and the corresponding customer for whom the container 110 was provisioned. In an embodiment, the event applier service 116 provisions one or more worker systems that can process the state change information 114. A worker system may be a software container, host, server, process, or application that is configured to obtain state change information for a particular container, a set of containers, or corresponding to a particular customer or delivery method. For instance, the event applier service 116 may provision a worker system and provide the worker system with a task definition for processing a portion of the state change information 114 obtained from the transaction journal 112. The portion of the state change information 114 may correspond to data that is to be provided to the computing resource monitoring service 120 to make the data available to customers. In some embodiments, the event applier service 116 obtains customer information and preferences related to the containers specified in the state change information 114 to determine where event data for the containers is to be delivered. Thus, the event applier service 116 may utilize this information to apportion tasks for processing subsets of the state change information 114 to the worker systems.

In an embodiment, the computing resource service provider maintains a plurality of event applier services, each of which may perform the operations described above. Each event applier service may access a processing database, which may utilize a lock for allowing one event applier service to perform the operations described above, including obtaining new state change information from the transaction journal 112 and compiling the new state change information into event data for the one or more containers 110. Once the operations have been performed by the event applier service, the event applier service may release the lock in the processing database to enable other event applier services to perform the operations if new state change information is available. The lock may be obtained on a "first come, first served" basis such that the first event container service to obtain the lock may perform the operations while preventing other event applier services from performing the same operations. The event applier service that performs the operations to generate the new event data may update its state change database to denote which state change information has been processed. Changes to this state change database may be propagated to the other event applier services in order to maintain synchronization of work performed by the event applier services collectively.

In some embodiments, the processing database may utilize a plurality of locks, whereby each lock may correspond to a portion of work that can be performed by an event applier service. The locks may be utilized based at least in part on a percentage of processes that can be performed for processing new state change information. Thus, if an event applier service utilizes a lock from the plurality of locks, the event applier service may obtain a subset of the newly available state change information from the transaction journal 112 and generate event data for this subset. The other subsets of the state change information may be processed by any other event applier services that obtain the remaining locks of the plurality of locks.

In an embodiment, the event applier service 116 provides, to the computing resource monitoring service 120, event data 118 as it is generated by its one or more software containers. The computing resource monitoring service 120 may store the event data 118 within one or more datastores and update entries corresponding to customers of the computing resource service provider in a database to specify the location of event data 118 for the containers of these customers. Thus, in response to a request from a customer 102 to obtain event data 118 for its one or more containers 110, the computing resource monitoring service 120 may access its database to locate the event data 118 within its datastores that can be used to fulfill the request. The computing resource monitoring service 120 may obtain the event data 118 from its datastores and provide these to the customer 102.

For instance, in the request, the customer 102 may specify one or more identifiers for the one or more containers 110, as well as a time range for which event data 118 is to be obtained corresponding to events occurring during the time range. The computing resource monitoring service may include a front-end server, which may be configured to obtain measurements, in the form of event data 118, from a variety of different sources, including customers of the computing resource service provider, various other services of the computing resource service provider, and computing resources made available to the customers through the various services. In response to a request from the customer 102 to obtain event data 118 for its one or more containers 110, the front-end server of the computing resource monitoring service 120 may access its datastore of event data to identify any event data obtained from the event applier service 116 that can be provided to the customer 102 to fulfill its request. For instance, the computing resource monitoring service 120 may evaluate a database of event data to identify one or more entries corresponding to the customer 102. These entries may specify the location of event data within the datastore for the customer's containers. If the database specifies that no event data is available for the customer 102, the computing resource monitoring service 120 may transmit a notification to the customer 102 to indicate that the requested data is unavailable.

Figure 2:
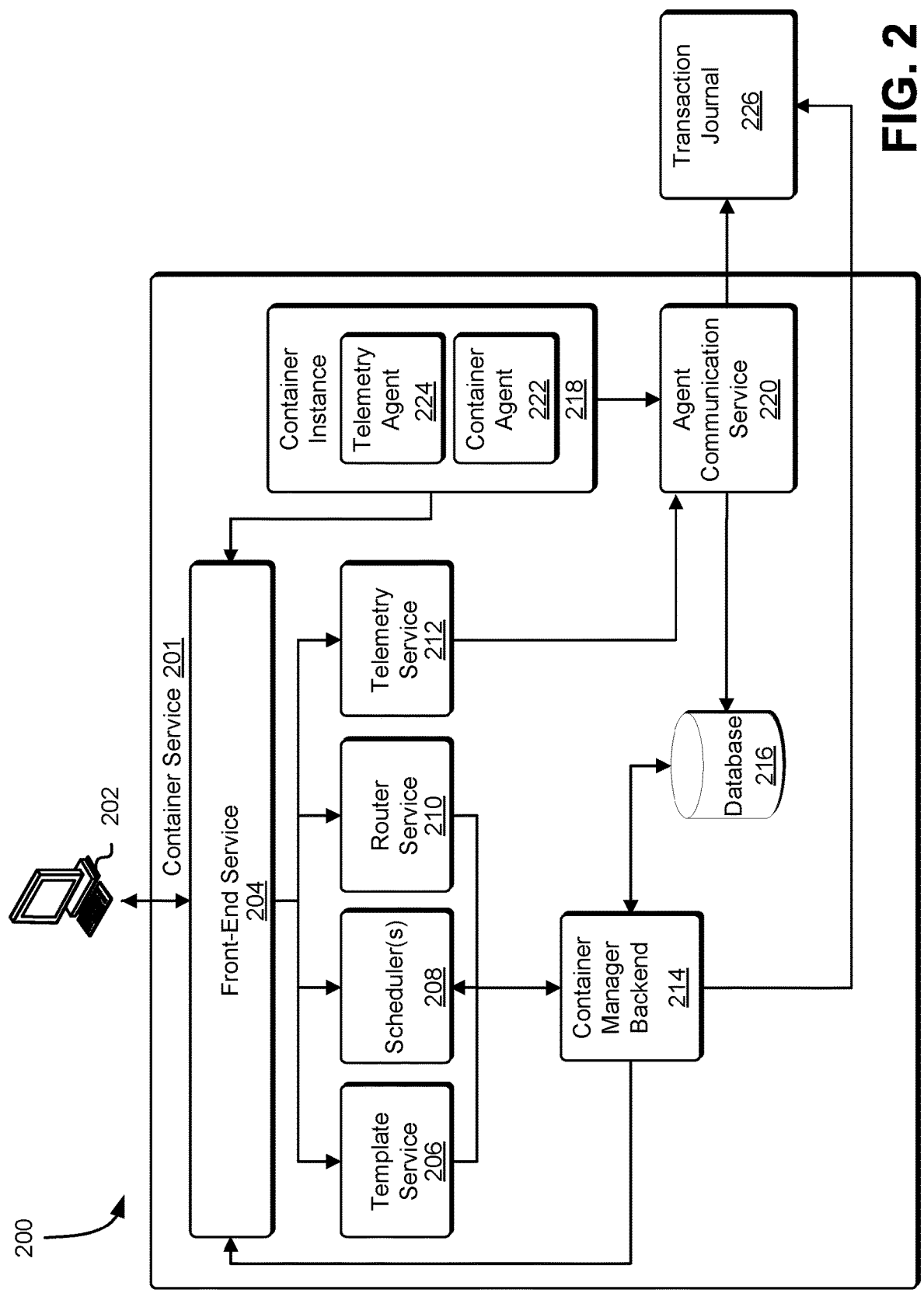
FIG. 2 shows an illustrative example of an environment in which a container service generates and transmits state change information for one or more containers to a transaction journal in accordance with at least one embodiment.

FIG. 2 shows an illustrative example of an environment 200 in which a container service 201 generates and transmits state change information for one or more containers to a transaction journal 226 in accordance with at least one embodiment. As illustrated in FIG. 2, the environment 200 may include customers 202 of a computing resource service provider communicating through a front-end service 204 manage one or more containers within one or more container instances 218. As noted, a container encapsulation system provided by or interfaced to the container service 201 may allow a customer to configure one or more applications within a container of an operating system which supports containers. The running processes and resources within the container may be isolated from other processes of the parent container instance and from the running processes and resources within other containers of the same host system. The customer may specify the amount of memory and processing capacity allocated to the container. The base container and the applications and data within it may then be packaged as an image, including one or more programs, data, and any system dependencies (e.g., libraries, files, etc.) that are needed for the programs to run on the operating system of the container instance. In some examples, an "image" may refer to an entire copy of a particular state of the base container at the time the image was generated. The image thereafter may be used to launch one or more identical containers, each of which may be assigned the specified amount of resources and may be isolated from each other. The containers may be launched on the same or different physical machines and each container may be expected to run in exactly the same way as the base container.

Each of the container instances 218 may be configured to contain a pair of agents, the container agent 222 and a telemetry agent 224, that may allow containers to be managed, may provide cluster state information, and may enable logging and telemetry data collection. The container service 201 may be comprised of a set of services, including a template service 206, one or more schedulers 208, a router service 210, and a telemetry service 212. Because the container service 201 may be configured as a multitenant service (i.e., the resources of the container service 201 may serve multiple customers concurrently), and because the services provided by the container service 201 exist outside and separate from the container instances 218, the customers 202 need not install individual software applications within their respective container instances 218 to provide the functionality afforded by the services. The customers 202 may utilize the functionality provided by these services by making web service application programming interface function calls through the front-end service 204, which may be configured to receive requests from the customers 202 and forward the requests to the appropriate service, such as the appropriate container manager backend service 214.

As noted, a customer may launch one or more clusters and then manage user and application isolation within each cluster through the front-end service 204. For example, the customer may specify that "instances 1-10" should comprise a first cluster and "instances 11-15" should comprise a second cluster. Thereafter, when the customer submits a launch request for a container, the customer may specify whether the container should be launched in the first cluster or the second cluster.

Each cluster may have a cluster identifier (ID) that uniquely distinguishes the clusters from each other. Clusters may be specified by referring to their respective cluster ID. A customer may use different clusters for different types of tasks. For example, a customer may use a first cluster for launch services and may use a second cluster for executing batch jobs. The instances in the first cluster may have been optimized for running a server, and the instances of the second server may have been optimized for submitting short-lived transient jobs, like batch jobs.

Once a cluster is created and running, the DescribeCluster application programming interface call may be used by the customers 202 or applications to request information about a cluster. In response to the DescribeCluster application programming interface call, information about the cluster may be returned. This information may include a list of what applications are running in the cluster, resources available to the cluster and their types. Information returned from the DescribeCluster application programming interface call may then be used as parameters for a StartTask application programming interface call to launch a task within the described cluster.

The scheduler 208 may be configured to launch tasks within the described cluster. Alternatively, the customers 202 may implement their own scheduler, rather than the scheduler 208, and use the information retrieved by the DescribeCluster application programming interface call in conjunction with the placement logic of the customer scheduler to make placement decisions for scheduled tasks. The customer may design and/or upload a placement algorithm to be used by his/her own scheduler, or may select from a list of possible placement algorithms provided to the customer by the computing resource service provider. The container service 201 may determine, based on available resources, whether to accept or reject placement decisions made by the customer scheduler.

The scheduler 208 may be a multitenant service configured to optimally schedule a set of tasks to run with a cluster. In this way, the customers 202 need not choose where the tasks should be executed. The placement scheme of the scheduler 208 may be configured to distribute tasks evenly over the cluster (e.g., round robin fashion, stochastic distribution scheme, etc.), and may be configured to distribute tasks based on a current or projected resource consumption by the cluster, in order to make the most efficient use of available resources. The scheduler 208 may obtain cluster manager metadata and other information about the availability of the container instances 218 in a cluster via the container manager backend services 214. The cluster manager metadata and other information may include data about the current state of the container instances 218 assigned to the cluster, available resources within the container instances, containers running within the container instances, and other information usable by the scheduler 208 to make placement decisions. The DescribeCluster application programming interface call may cause the cluster manager backend service to provide the cluster metadata for the specified cluster.

The scheduler 208 may distribute tasks based at least in part on security rules, security groups, and/or security roles, have affinity, and anti-affinity. For example, tasks within a certain security group may be configured to be launched on the same container instance whenever possible or practicable, or, conversely, may be scheduled to be launched in separate container instances. As another example, tasks may be assigned to certain security groups or designated to have certain security roles, and, based on the particular security group assigned or security role designated, a task may be assigned to run in a specific cluster or specific cluster instances or may have priority for resources over other tasks.

Task distributions based on affinity/anti-affinity include assigning "tags" indicating relationships between containers, container instances, and tasks. As an example of distribution based at least in part on affinity, two container instances may be tagged as "general" and one container instance may be tagged as "database." In a task definition, a task could be specified with a "general" launch constraint providing affinity that the task is to be launched into one (or more) of the container instances tagged as general. As an example of task distribution of anti-affinity, certain container instances may be tagged as "secure-credit-card-processing" and certain other container instance may be tagged as "http-website." Because http-website containers may be serving traffic from untrusted outside entities, it may be desirable not to share such containers with credit card processing tasks. Thus, a task definition may be configured to indicate that "http-website" is anti-affinity to credit card processing tasks to ensure that credit card processing containers are not launched in "http-website" tagged container instances. In this example, the scheduler 208 can be configured to parse any tags in a task definition and use it to filter out container instances that do not meet the criteria associated with the tag. Next, the scheduler 208 can select a container instance from the filtered set to host the container.

In some embodiments, the scheduler 208 communicates directly with the container agents 222 to launch tasks. In other embodiments, the scheduler 208 communicates with the agent communication service 220, which may relay the communication to the container agent 222. In still other embodiments, the scheduler 208 communicates placement decisions to the container manager backend service 214, which may communicate directly to the container agent 222 or to the agent communication services 220. As noted, in some embodiments, the customers 202 can alternatively implement their own schedulers for task management rather than using the scheduler 208.

In some cases, containers may be configured to compete for resources and, in cases of conflict, containers associated with certain security roles may have priority over other containers. Note that in all cases, the placement scheme may take the available resources in the container instances and the resource requirements of the container into account. For example, a container instance may not be selected for particular tasks if the particular tasks have resource requirements exceeding the available resources in the container instance. In some implementations, however, the container instance may still be selected but launching of the particular tasks may be delayed until enough resources become available within the container instance to support running the particular tasks.

Containers may also be configured to utilize other resources provided by the computing resource service provider. For example, each container may be configured with a virtual network interface to allow the container to communicate through the virtual network to other containers and/or other resources of the computing resource service provider. Likewise, security credentials may be assigned on a per-container basis so that containers have their own security credentials to access the other resources provided by the computing resource service provider. Additionally, the container service may be configured to integrate with a load-balancing service to load-balance workloads directed at the containers. For example, a customer may present a list of internet protocol addresses associated with virtual networks of the customer's containers and/or customer instances to a load-balancer of the load-balancing service and instruct the load-balancer to balance workloads between the internet protocol addresses. In addition, the container service may be integrated with an auto-scaling service to allow resources utilized by the containers to be dynamically adjusted as needed.

The cluster may be managed through application programming interface calls made to the front-end service 204. For example, an application programming interface call could be made to request a list of what clusters are available and what containers may be running on which clusters. The ListClusters application programming interface call may list all clusters to which a customer has access. The DeleteCluster application programming interface call may delete a specified cluster. Available application programming interface function calls for container instances may include RegisterContainerinstance, DescribeContainerInstance, and DeregisterContainerInstance. A RegisterContainerinstance application programming interface call may be used by a container agent of a container instance to register the container instance with a cluster manager once the container instance is instantiated. In some implementations, the cluster manager is comprised of metadata about the clusters (e.g., the grouping of container instances). In other implementation, the cluster manager may comprise configuration management software installed by a customer or made available by the computing resource service provider. The scheduler may then refer to the container instances 218 registered with the cluster manager when determining into which container instance the containers should be launched. The DescribeContainerInstance application programming interface call may return information about the container instance, including resources available to the container instance and running tasks within the container instance.

Application programming interface function calls for tasks may include StartTask, DescribeTask, ListTasks, and StopTask. A customer may pass a task definition file (or their respective identifiers) as parameters to the StartTask application programming interface call and may further specify a container instance or cluster to launch one or more tasks within the container instance or cluster. For example, the customer may have obtained one or more container instance IDs of a cluster in response to a DescribeCluster application programming interface call, and may specify to execute a task definition file on the one or more identified container instances. If a customer is running tasks directly, they may call the StartTask application programming interface and specify the container instance to launch into. Alternatively, the scheduler 208 may use the StartTask application programming interface to launch tasks. In addition, the customers 202 may configure their own scheduler to use the StartTask application programming interface to launch tasks.

The scheduler 208 or customer-installed scheduler may also be configured to start tasks within a task definition file, and determine where to place the tasks within the cluster. For example, the scheduler 208 may determine to distribute tasks evenly between the container instances of the cluster, distribute tasks in some chi-squared distribution, or may distribute tasks among container instances of a cluster according to some other heuristic or set of constraints. Parameters passed to the StartTask application programming interface call may specify, such as by passing a task definition file outlining multiple tasks, that multiple tasks should be started. In some implementations, the customer 202 may, rather than specify a single cluster or container instance, specify a list of clusters or container instances and the scheduler 208 may determine in which of the container instances to execute the tasks.

In some embodiments, the containers may be configured to attach to other services of the computing resource service provider, such as block-level data storage services and/or on-demand data storage services. In some cases, containers may be configured to share attached services with other containers. As an example, a container instance of a customer may be mapped to a block-level storage volume of a block-level storage service of a computing resource service provider, and the containers within the instance may each be configured to be able to read from and/or write to the block-level storage volume. In some examples, the block-level storage volume may be shared between multiple container instances, such as all container instances within a cluster or multiple clusters, such that container instances within the cluster or clusters may all be able to share the block-level storage volume with their running containers. As another example, a container instance may be mapped to 20 different block-level storage volumes, but only two of the block-level storage volumes are specified for the containers.

The template service 206 may be configured to allow the customers 202 to define a task definition for their containers. In some examples, a "task definition" may refer to a script or set of metadata that may define a group of containers; e.g., the number of containers, their types, their components, their relationships to other containers, information describing associated instances, and other metadata. Task definitions may also specify that groups of containers are to be launched in coordination. The template service 206 may receive task definitions from the customers 202, store the task definitions in the database 216, and allow the customers 202 to create, view, update, delete, and otherwise manage their task definitions.

The container manager backend service 214 may be configured to provide other management services and resources to the sub-fleet on the backend, such as the cluster management software or cluster manager metadata described in the present disclosure. The container manager backend service may be configured to receive task definitions from the template service 206, store the task definitions in the database 216, receive cluster manager metadata from container instances 218 or the agent communication service 220, and provide task definition information and the cluster manager metadata to the scheduler 208 or a customer installed scheduler upon request. The container manager backend service may be configured to provide information about a specified cluster, such as cluster manager metadata, in response to a DescribeCluster application programming interface call.

The agent communication services 220 and container manager backend service 214 may be implemented on separate computer systems within the sub-fleet, separate virtual machine instances within the sub-fleet, may share the same computer systems and/or virtual machine instances within the sub-fleet, or may run on computer systems separate from but in communication with their respective sub-fleet. There may be multiple container instances 218 per sub-fleet. In some cases, each sub-fleet may represent a single cluster. In other cases, clusters may span multiple sub-fleets. In still other cases, each sub-fleet may host more than one cluster. The router service 210 may be configured to route requests from the front-end service 204 to the appropriate sub-fleet. In some embodiments, the router service 210 may route requests to a single sub-fleet. In other embodiments, the router service may route requests between multiple sub-fleets.

The telemetry service 212 may be configured to aggregate control group metrics (e.g., information about the processes running within the containers) and container logs and provide the aggregated metrics and logs to a resource monitoring service to allow the customers 202 to monitor resource utilization, such as processor, storage, and network usage, of their respective container instances. Control group metrics include information such as the amount of memory used by processes of the containers, number of times that a process triggered a page fault, central processing unit usage by the processes of the containers, time during which the central processing units were executing system calls on behalf of processes of the containers, number of reads and writes by the processes of the containers, and number of input/output operations queued for the processes of the containers.

The container manager backend service 214 may be configured to receive placement requests from the customers 202 for their containers through the front-end service 204, and may ensure that the requested resources are available for the containers. The container manager backend service 214 may then write the desired container state to the database 216. In some implementations, the container manager backend services is responsible for the cluster manager metadata, which may be stored in the database 216, and provided to the scheduler 208 or customer-installed scheduler when requested. Additionally, the container manager backend services may receive information from individual container agents 222 regularly, such as information related to lifecycle events and heartbeats (e.g., periodic signals sent by the container agents 222 to indicate normal operation). In some cases, this information may be communicated to the appropriate component or entity through the front-end service 204. In some implementations, the container agents communicate this information through the agent communication service 220, which may then communicate the information directly to the container manager backend service 214, or, in other implementations, stores the information in the database 216 whereupon the container manager backend service 214 can read the information.

The database 216 may be a data store located within the distributed computing system of the container service 201, or may be a data store of a different service of a computing resource service provider, such as a relational database service. In some embodiments, the database 216 may be a set of distributed databases that share a transaction log. The agent communication services 220 may be configured to track the status of all agents in a cluster, and may push run commands and state transitions to its respective instance. In some embodiments, communication by other components of the container service, with containers and the container instances 218 is performed through the agent communication service 220. Each fleet may have at least one agent communication service which relays the messages between the container agents 222 of the fleet.

The container agents 222 may be software applications configured to run in instances owned by the customers 202 and may act as an interface between their respective container instances 218 and other services and entities, such as the container manager backend service 214. For examples, the container agents 222 may act as intermediaries between the running tasks of their respective container instances 218 and other entities and services such that all communication to or from a container passes through the container agent. In this manner, the container agent may be configured to interpret and translate commands between the container and a particular container encapsulation system running with the container service 201. This may allow changes to be made to the particular container encapsulation system without requiring updates to be made to the tasks or task definitions;

i.e., only the container agents 222 may need to be updated to reflect the changes to the particular encapsulation system.

Thus, each of the container instances 218 may have a respective container agent running within it that communicates with a respective container manager backend service. The container agent may, itself, be a container configured to monitor its respective container instance and may provide information to the system usable to launch containers, track containers, and monitor cluster state. For instance, the container agent may transmit state change information for containers of the container instance to the agent communication service 220. In an embodiment, the agent communication service 220 provides the state change information from the container agent 222 to a transaction journal 226 that is implemented to aggregate state change information for container instances of the container service 201. The transaction journal 226, as described above, may be a replicated state machine implemented using a plurality of replication nodes. Each node of a particular replication transaction journal 226 may be responsible for replicating state change information of at least a particular cluster or container instance, e.g., in the form of state change records written to a local disk or other similar storage device. In some embodiments, the state change information provided by the agent communication service 220 may specify a version number or version number field that may be used to generate an ordering of state change information for a particular container instance or cluster. If the state change information specifies a version number or version number field, the transaction journal 226 may evaluate any other state change information stored therein to identify the latest version number for the container instance or cluster. The transaction journal 226 may iterate the latest version number to generate a new version number and append this new version number to the state change information provided by the agent communication service 220.

In an alternative embodiment, the agent communication service 220 stores the state change information from the container agent 222 in the database 216. The container manager backend service 214 may access the database 216 to obtain any newly added state change information for the container instances and/or clusters, which the container manager backend service 214 may provide to the transaction journal 226. In yet another embodiment, the container service 201 maintains a replicated state machine that is configured to be synchronized with the transaction journal 226. Thus, the agent communication service 220 or the container manager backend service 214 may refer to the replicated state machine of the container service 201 to identify the current version number for a particular container instance, cluster, or container and append new state change information with an iterated version number. The new state change information may be transmitted to the transaction journal 226 with the newly updated version number.

The container agent may also perform functions of registering and deregistering its respective container instance, starting and stopping tasks within its respective container instance. The container agent may also be configured to respond to requests to describe its respective container instance, requests to list tasks running in its respective container instance, and requests to describe tasks running in its respective container instance. The container agents 222 may be configured to monitor the health of the containers within the respective container instances 218 (e.g., report heartbeats signaling that the container instance is operating, report lifespans of containers, and report container statuses and occurrences of container errors), and may further be configured to perform actions based on the occurrence of certain events. For example, if a container agent detects that a container has encountered an error and ceased operation, the container agent may automatically cause a new container to be generated to replace the malfunctioning container. In other embodiments, the scheduler 208 may take certain actions in response to events reported to it by the container agents 222. In the above example, it may be the scheduler 208 that causes a new container to be generated to replace a malfunctioning container. The customer owner of the container may specify conditions, events, and actions for the scheduler 208 and/or container agent. For example, the customer may specify if the customer's containers cease operations, such as due to an error or power outage, that the scheduler 208 or container agent is not to generate replacement containers for the inoperative containers. Instead the customer may specify that the scheduler 208 or container agent is to notify (e.g., by changing a status indicator, providing an e-mail message, etc.) the customer of the occurrence of the problem.

The container agents 222 and/or the telemetry agents 224 may be configured to launch automatically when their respective container instances 218 are instantiated. If a new container encapsulation system is implemented by the container service 201, the only changes required for the container instances 218 and containers may be for new container agents configured to be compatible with the new container encapsulation system to be created and the container agents 222 to be swapped for the new container agents. In such a case, the customers 202 should be able to use the same application programming interfaces with the container service 201, and the new container agents should be configured to support the same application programming interfaces without the customers 202 being aware of the change to the new encapsulation system.

The telemetry agent 224 may collect telemetry data, such as a set of control group metrics and container encapsulation system logs, and provide such telemetry data to the telemetry service 212. The telemetry service 212 may aggregate data received from the telemetry agent 224 for a computing resource monitoring service of a computing resource service provider, which, in turn may be configured to trigger an alarm or take some other action based on the aggregated data. For example, if the telemetry agent 224 communicates a log indicating an error state of a container to the telemetry service 212, the telemetry service 212 may provide the error state to the agent communication service 220, which may provide the error state to the transaction journal 226. As will be described in greater detail below, the transaction journal 226 may make the error state available to an event applier which, in turn, may provide event data that specifies the error state to the computing resource monitoring service, which reacts by triggering an alarm notifying the customer that the container has experienced an error. As another example, the computing resource monitoring service may trigger an alarm if one of the metrics (e.g., central processing unit usage by processes of a container) provided by the telemetry service 212 exceeds a threshold. Note, in some implementations, the telemetry service may be configurable to specify the alarm conditions and thresholds. Examples of triggering an alarm include providing a text message to the customer owner of the container, e-mailing the customer owner of the container, and/or displaying a visual indicator (e.g., a red icon, popup window, etc.) on an interface displaying container statuses.

Figure 3:
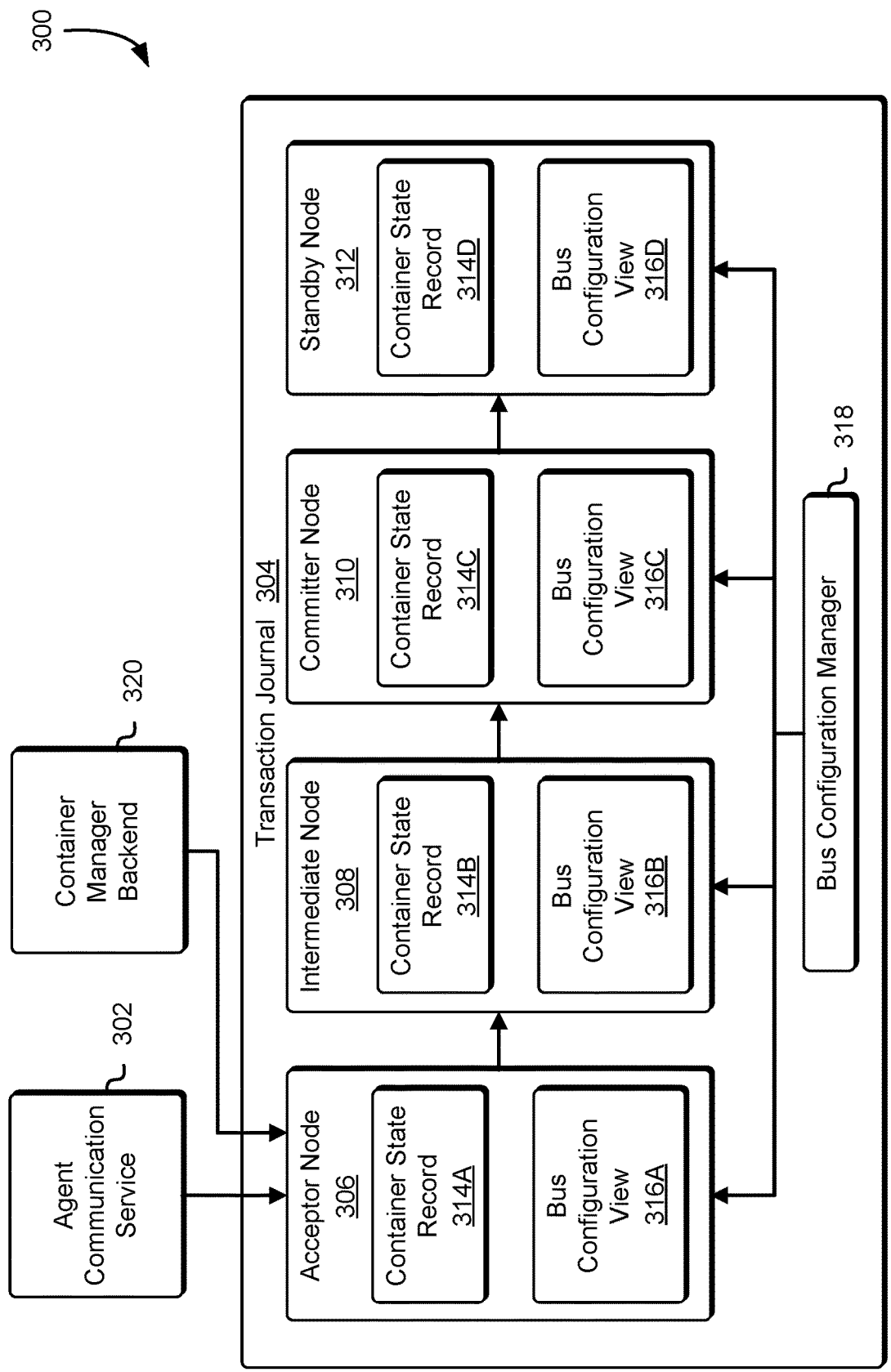
FIG. 3 shows an illustrative example of an environment in which a transaction journal of replication nodes is established for managing state change information in accordance with at least one embodiment.

FIG. 3 shows an illustrative example of an environment 300 in which a transaction journal 304 of replication nodes is established for managing state change information in accordance with at least one embodiment. In the environment 300, a transaction journal 304 is established for managing state change information provided by an agent communication service 302 or container manager backend service 320 of a container service. As described above, the agent communication service 302 may provide state change information generated by a container agent of a container instance, which in turn obtains state change data from containers of the container instance. Additionally, the container manager backend service 320 may access a database of the container service to obtain any newly added state change information for the container instances and/or clusters, which the container manager backend service 320 may provide to the transaction journal 304. The transaction journal 304 may comprise a replication pathway with three nodes: an acceptor node 306, an intermediate node 308, and a committer node 310. Additionally, the transaction journal 304 may include a standby node 312, which may be available to take over the responsibilities of any of the other nodes if required. Other combinations of nodes may be deployed for other transaction journals—e.g., more than one intermediate node may be used for some applications, no intermediate nodes may be used for other applications, or standby nodes may not be established. Changes to the configuration of the transaction journal 304 may be coordinated by a bus configuration manager 318, as described below.

The acceptor node 306 may receive state change information via one or more APIs from the agent communication service 302. The acceptor node 306 may accept state change information for an eventual commit, or may reject the state change information, using application-dependent rules or logic. If state change information is accepted, a sequence number may be generated by the acceptor node 306, e.g., indicative of an order in which that state change information was accepted relative to other accepted state change information. As mentioned above, in some embodiments the sequence number may comprise a counter that is incremented for accepted state change information, while in other embodiments a logical clock or timestamp value provided by the configuration manager may be used. A collection of state change records 314A including corresponding sequence numbers may be stored in local persistent storage by the acceptor node 306. In some embodiments, the state change records may comprise both state change accept records and state change commit records (with a commit record being stored only after the acceptor node 306 is informed that the corresponding state change was committed by the committer node 310). In other embodiments, at least some nodes along the replication pathway may only store state change accept records. After storing a state change record indicating acceptance, the acceptor node may transmit a state change message indicating the approval to its successor node along the replication pathway, such as intermediate node 308 in the illustrated configuration.

The intermediate node 308 may store its own copy of a corresponding state change record 314B, together with the sequence number, in its local state change record collection. The intermediate node may transmit its own state change message to its neighbor along the current replication pathway, e.g., to the committer node 310 in the depicted embodiment. In at least some implementations, the state change message may include an indication of which nodes have already stored replicas of the state change records—e.g., the message may indicate to the committer node 310 that respective replicas of the state change record indicating acceptance have been stored already at nodes 306 and 308 respectively.

In response to a determination at the committer node that a sufficient number of replicas of the state change record have been stored (where the exact number of replicas that suffice may be a configuration parameter of the agent communication service 302), the state change information may be committed. The state change record collection of the committer node 310 may comprise records of state change commits (as opposed to approvals) in the depicted embodiment; thus, the container state record 314C may indicate a commit rather than just an acceptance. In at least some embodiments, the committer node 310 may transmit indications or notifications to the acceptor node 306 and/or the intermediate node 308 indicating that the transition was committed. In other embodiments, the acceptor node 306 and/or intermediate node 308 may submit requests (e.g., periodically) to the committer node 310 to determine which transitions have been committed and may update their state change record collections accordingly. For some agent communication services 302, explicit commits may not be required; thus, no indications of commits may be stored, and each of the transaction journal nodes along the pathway may simply store respective application state records indicating acceptance. In the depicted embodiment, post-commit state change messages may be transmitted from the committer node 310 to the standby node 312 to enable the standby node 312 to update its container state record collection (e.g., by storing a commit container state record 314D), so that if and when the standby node is activated to replace another transaction journal node, its state change information matches that of the committer node 310.

A transaction journal configuration manager 318 may be responsible for propagating changes to the transaction journal configuration or membership in the form of configuration-delta messages to the transaction journal nodes as needed in the depicted embodiment. When a given transaction journal node leaves the transaction journal 304, e.g., as a result of a failure, a corresponding configuration-delta message may be sent to one or more surviving nodes by the transaction journal configuration manager 318, for example. Similarly, when a new node joins the transaction journal 304 (e.g., after a recovery from a failure, or to increase the durability level of the agent communication service 302), a corresponding configuration-delta message indicating the join event, the position of the joining node within the transaction journal 304, and/or the role (e.g., acceptor, intermediate, committer, or standby) granted to the joining node may be transmitted by the transaction journal configuration manager 318 to one or more current member nodes of the transaction journal 304. The configuration-delta messages may be asynchronous with respect to each other, and may be received by their targets in any order without affecting the overall replication of application state. Each node of the transaction journal 304 may be responsible for constructing its own view 316 of the transaction journal configuration based on received configuration-delta messages, independently of the configuration views 316 that the other nodes may have. Thus, for example, because of the relative order and/or timing of different configuration-delta messages received at respective nodes 306, 308, 310, and 312, one or more of the configuration views 316A, 316B, 316C and 316D may differ at least for some short time intervals in some embodiments. At least some embodiments, each transaction journal node stores representations or contents of some number of the configuration-delta messages received in respective local configuration change repositories. In the depicted embodiment, the transaction journal configuration manager 318 may not enforce stop-the-world pauses in application state processing by the transaction journal nodes (e.g., it may allow the nodes to continue receiving and processing state change messages regardless of the timing of configuration-delta messages or the underlying transaction journal configuration changes).

In an embodiment, each transaction journal node may determine whether the received state change information specifies a version number or version number field. If the received state change information does specify a version number of version number field, each node may access its state change record to determine previous state change information received for the particular container to identify the latest version number in the record. Each node may increment this latest version number to generate a new version number that may be appended to the newly received state change information. The state change information may then be added to the state change record for the corresponding node. The state change information including the incremented version number may be committed by the committer node 310.

In some embodiments, the transaction journal 304 makes the committed state change information available to an event applier service, which may obtain the committed state change information to generate event data for one or more containers. For instance, the committer node 310, in addition to committing the state change information, may transmit the state change information to the event applier service. Alternatively, the event applier service may transmit a request to the transaction journal 304 to obtain any newly added state change information since its last request to the transaction journal 304. In response to the request, the transaction journal 304, through the committer node 310, may identify the newly committed state change information added to the transaction journal 304 and provide this newly committed state change information to the event applier service, fulfilling the request.

Figure 4:
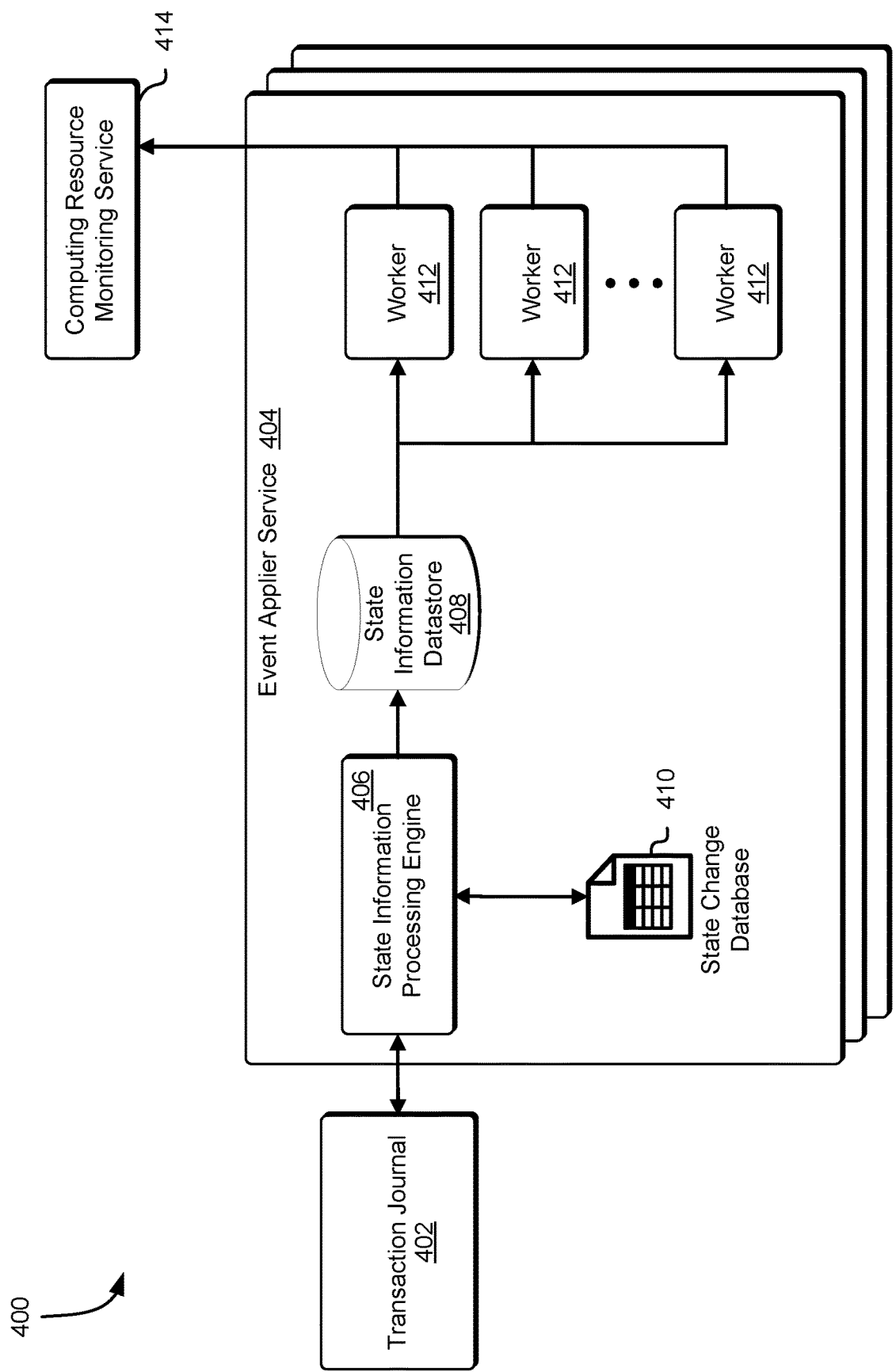
FIG. 4 shows an illustrative example of an environment in which an event applier service compiles state change information into event data for dissemination to a computing resource monitoring service in accordance with at least one embodiment.

FIG. 4 shows an illustrative example of an environment 400 in which an event applier service 404 compiles state change information into event data for dissemination to a computing resource monitoring service 414 in accordance with at least one embodiment. In the environment 400, a state information processing engine 406 of an event applier service 404 obtains state change information from a transaction journal 402. As noted above, the state change information may correspond to one or more containers provided by a container service to its customers. This state change information may include an identifier for its corresponding container, as well as a customer identifier for the customer that provisioned the container to perform a task. The state information processing engine 406 may be a server, an application installed on a server or other host, or a process that may obtain the state change information from the transaction journal 402 and add the state change information to state information datastore 408. As described above, the computing resource monitoring service may operate various event applier services for processing state change information from the transaction journal 402. In order to process newly available state change information, the event applier service 404 may obtain a lock from a processing database. With the lock, the event applier service 404 may be authorized to process newly available state change information while preventing any other event applier service from performing the same operations.

In an embodiment, if the event applier service 404 obtains the lock from the processing database, the state information processing engine 406 accesses a state change database 410 that comprises one or more entries denoting state change information previously processed by the event applier service 404 or any other event applier service of the computing resource service provider. The state information processing engine 406 may access the transaction journal 402 and access the state change record of the transaction journal 402 to identify the state change information specified in the state change record. The state information processing engine 406 may compare the state change information specified in the state change record to the state change information previously processed by the event applier services to determine whether new state change information is available for processing. If new state change information is available, the state information processing engine 406 may obtain the new state change information from the transaction journal 402 and add the new state change information to the state information datastore 408 for processing. Further, the state information processing engine 406 may update the state change database 410 to indicate that the new state change information has been obtained and has been processed by the event applier service 404.

In an embodiment, the state information processing engine 406 provisions one or more worker systems 412 to process the received state change information from the transaction journal 402. The worker systems 412 may be software containers, servers, hosts, applications, or processes configured to process state change information from the state information datastore 408. Each worker system 412 may process state change information based at least in part on task definitions provided by the state information processing engine 406. For example, if event data corresponding to a subset of the state change information is to be transmitted to the computing resource monitoring service 414, the state information processing engine 406 may provision a worker system 412 and provide the worker system 412 with a task definition specifying the subset of state change information that is to be compiled into event data and the destination for the event data. The state information processing engine 406 may evaluate the state change information and determine, based at least in part on the state change information, customer preferences for the delivery of event data. Thus, the state information processing engine 406 may use this information to generate the task definition for each individual worker system 412.

Each worker system 412 may evaluate its task definition from the state information processing engine 406 to determine a subset of state change information stored in the state information datastore 408 that is to be processed to generate event data for one or more containers. A worker system 412 may access the state information datastore 408 to obtain a subset of the state change information stored in the state information datastore 408 assigned to it in the task definition. The worker system 412 may evaluate its subset of the state change information to identify the state transitions specified in the subset. These state transitions may be used by the worker system 412 to identify one or more events for the corresponding containers. Using these identified events, the worker system 412 may generate event data corresponding to the containers specified in the subset of state change information.

The worker system 412 may evaluate its task definition from the state information processing engine 406 to determine what to do with the event data generated by the worker system 412. For instance, the task definition may specify that the event data generated by the worker system 412 is to be transmitted to a computing resource monitoring service 414, where the event data may be made available to customers of the computing resource service provider. Based at least in part on this task definition, the worker system 412 may transmit its event data to the computing resource monitoring service 414, which may store the event data in its own datastore. If the task definition specifies that the event data is to be provided directly to the customer, a worker system 412 may transmit the event data to the customer via one or more preferred methods as specified by the customer. The event data may also be provided to other services, which may use the event data to perform one or more operations based at least in part on the events identified in the event data.

Figure 5:
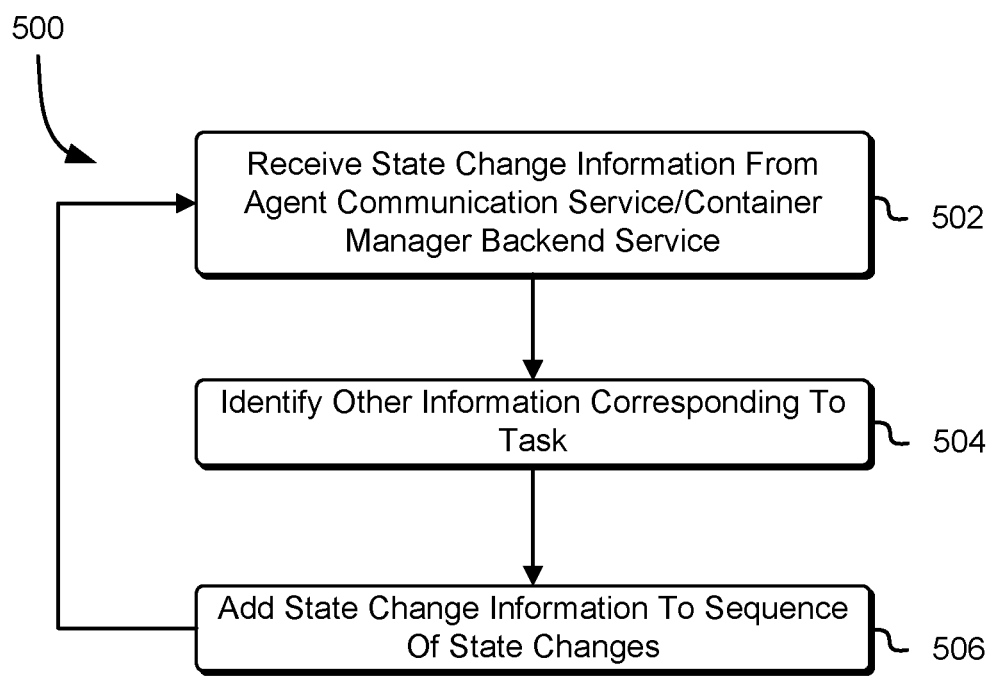
FIG. 5 shows an illustrative example of a process for adding state change information from an agent communication service to a sequence of state changes in accordance with at least one embodiment.

As noted above, an agent communication service or a container manager backend service of a container service may transmit state change information for one or more containers to a transaction journal. The transaction journal may add the received state change information to a sequence of state changes, where the sequence of state changes may be made available to an event applier service for compilation into event data for the one or more containers. Accordingly, FIG. 5 shows an illustrative example of a process 500 for adding state change information from an agent communication service to a sequence of state changes in accordance with at least one embodiment. The process 500 may be performed by the aforementioned transaction journal, which may aggregate state change information from the agent communication service and the container manager backend service into a sequence of state changes for a container or set of containers.

In an embodiment, the transaction journal receives 502 state change information from the agent communication service and/or the container manager backend service of the container service. As noted above, a container agent of a container instance may transmit state change information for containers of the container instance to the agent communication service. The agent communication service may provide the state change information from the container agent to the transaction journal. Additionally, the container manager backend service may access a database of the container service to obtain any newly added state change information for the container instances and/or clusters, which the container manager backend service may provide to the transaction journal. In response to receiving state change information from the agent communication service, the transaction journal may identify 504 other state change information that may correspond to the task performed by a container specified in the state change information. For instance, the agent communication service may track state changes for a container configured to perform a task on behalf of a customer. The transaction journal may maintain a plurality of sequences of state changes for each container or for each task performed by a container or set of containers. Thus, the transaction journal may use the received state change information to identify the sequence of state changes corresponding to the task or to the container performing the task.

The transaction journal may add 506 the received state change information to the corresponding sequence of state changes. This may enable an event applier service to obtain the received state change information and to process the state change information to generate event data for the container. In some embodiments, the transaction journal updates a state change record to specify that the received state change information from the agent communication service or the container manager backend service has been added to the sequence of state changes. This may enable an event applier service to evaluate the state change record and compare the state change record to its state change database to identify the newly received state change information that can be processed by the event applier service. The transaction journal may continue to receive 502 state change information from the agent communication service and/or the container manager backend service as it is generated by these services and update the sequence of state changes accordingly.

Figure 6:
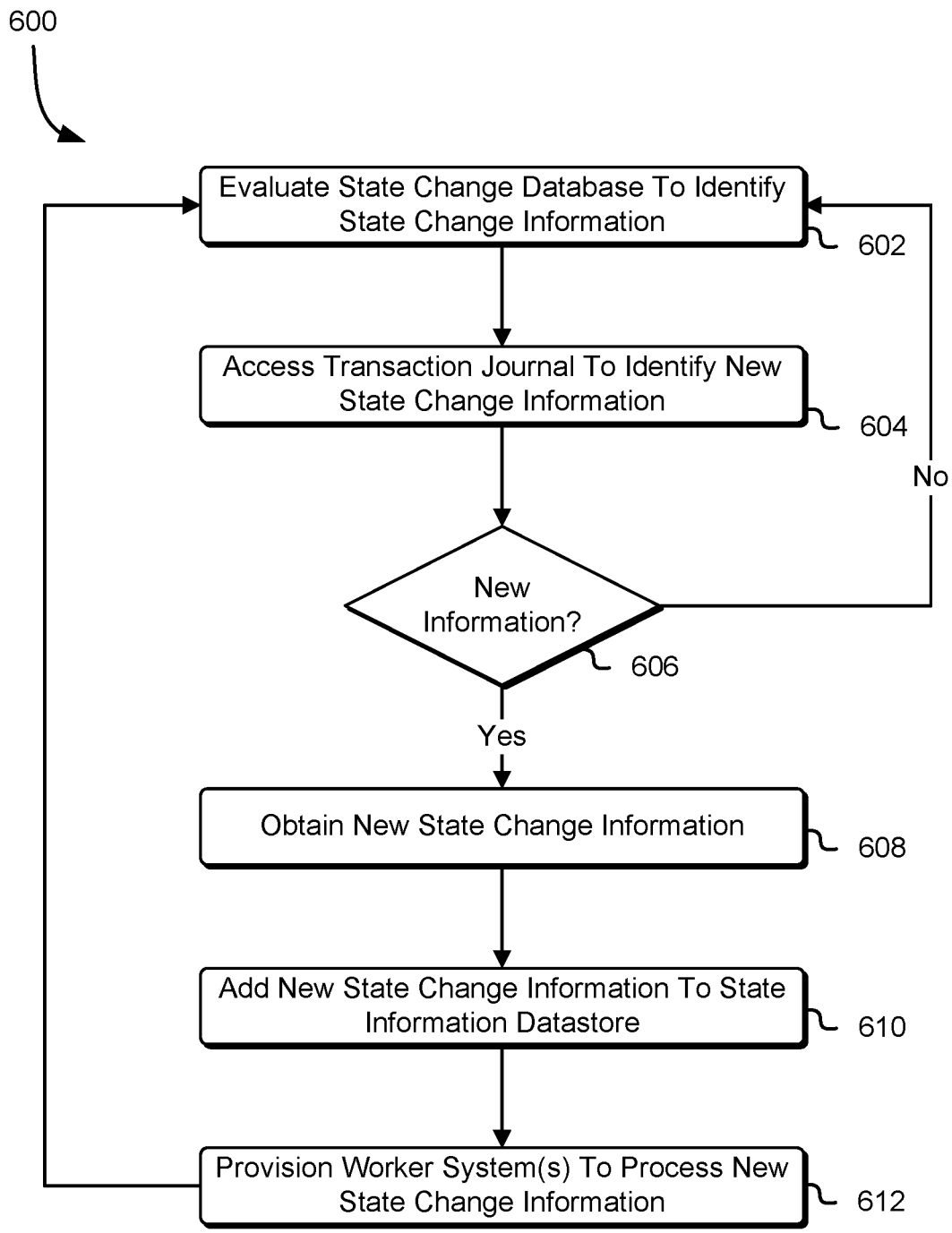
FIG. 6 shows an illustrative example of a process for obtaining state change information from a transaction journal for compilation into event data in accordance with at least one embodiment.

As noted above, the computing resource service provider may include one or more event applier services, which may obtain state change information from the transaction journal and process the state change information to generate event data for the corresponding containers specified in the state change information. The event applier services may add the state change information to a state information datastore, whereby one or more worker systems of the event applier service may process this information to generate the event data for each container on behalf of customers of the computing resource service provider. Accordingly, FIG. 6 shows an illustrative example of a process 600 for obtaining state change information from a transaction journal for compilation into event data in accordance with at least one embodiment. The process 600 may be performed by an event applier service, which may obtain and process state change information from the transaction journal.

In an embodiment, an event applier service accesses a processing database of the computing resource service provider to obtain a lock for processing state change information from the transaction journal. This lock may prevent other event applier services from accessing the transaction journal to obtain state change information from the transaction journal and generating event data using this state change information. If the event applier service obtains the lock from the processing database, the event applier service may evaluate 602 its state change database to identify state change information previously processed by the event applier service or by other event applier services of the computing resource service provider. The state change database may specify state change information processed by the one or more event applier services, as well as other state change information that may not have been processed but is stored within the state information datastore of each of the event applier services.

The event applier service may access 604 the transaction journal to identify any new state change information. For instance, the event applier service may evaluate the state change record for the transaction journal to identify the state change information specified in the sequence of state changes of the transaction journal. The event applier service may compare the state change record to the information obtained from the state change database to determine 606 whether there is new state change information within the sequence of state changes of the transaction journal. If the event applier service determines that the sequence of state changes does not include new state change information, the event applier service may release the lock from the processing database. Further, at a later time (e.g., periodically or in response to a triggering event, such as detection of lock release), the event applier service may attempt to obtain the lock from the processing database and, if successful, evaluate its state change database to identify state change information previously processed by the event applier services or any other state change information that has not been processed by the event applier services and is available in the state information datastore. Further, the event applier service may again try to identify any new state change information from the transaction journal.

If the event applier service identifies new state change information within the transaction journal, the event applier service may obtain 608 the new state change information from the transaction journal. Further, the event applier service may add 610 the new state change information to the state information datastore. In the state information datastore, the event applier service may organize the new state change information according to a container identifier for each container identified in the new state change information and/or to a delivery method for event data generated using the new state change information. This may enable worker systems of the event applier service to process state change information for a particular set of containers or for particular delivery methods.

Based at least in part on newly obtained state change information, the event applier service may provision 612 one or more worker systems to compile the newly obtained state change information into event data for the corresponding containers. In an embodiment, the event applier service evaluates the newly obtained state change information to identify the corresponding containers. The event applier service may identify one or more preferences for event data for these containers. This may include accessing the container service to identify any preferences defined by customers of the computing resource service provider for their containers. Additionally, the event applier service may identify any subscriptions for event data corresponding to the containers identified in the state change information. The event applier service may generate a task definition for each worker system. The task definition may define the subset of the newly obtained state change information that is to be compiled by the worker system, as well as the delivery method for the event data generated using the subset of the newly obtained state change information. The event applier service may provide the task definition to a worker system to enable the worker system to generate the event data and to deliver the event data according to the preferences specified in the task definition.

It should be noted that the process 600 may include additional and/or alternative steps. For instance, in some embodiments, the transaction journal transmits any newly obtained state change information to the event applier service as the information is added to the corresponding sequences of state changes. This may obviate the need for the event applier service to access the transaction journal to identify any new state change information, as the transaction journal may provide the new state change information to the event applier service automatically.

Figure 7:
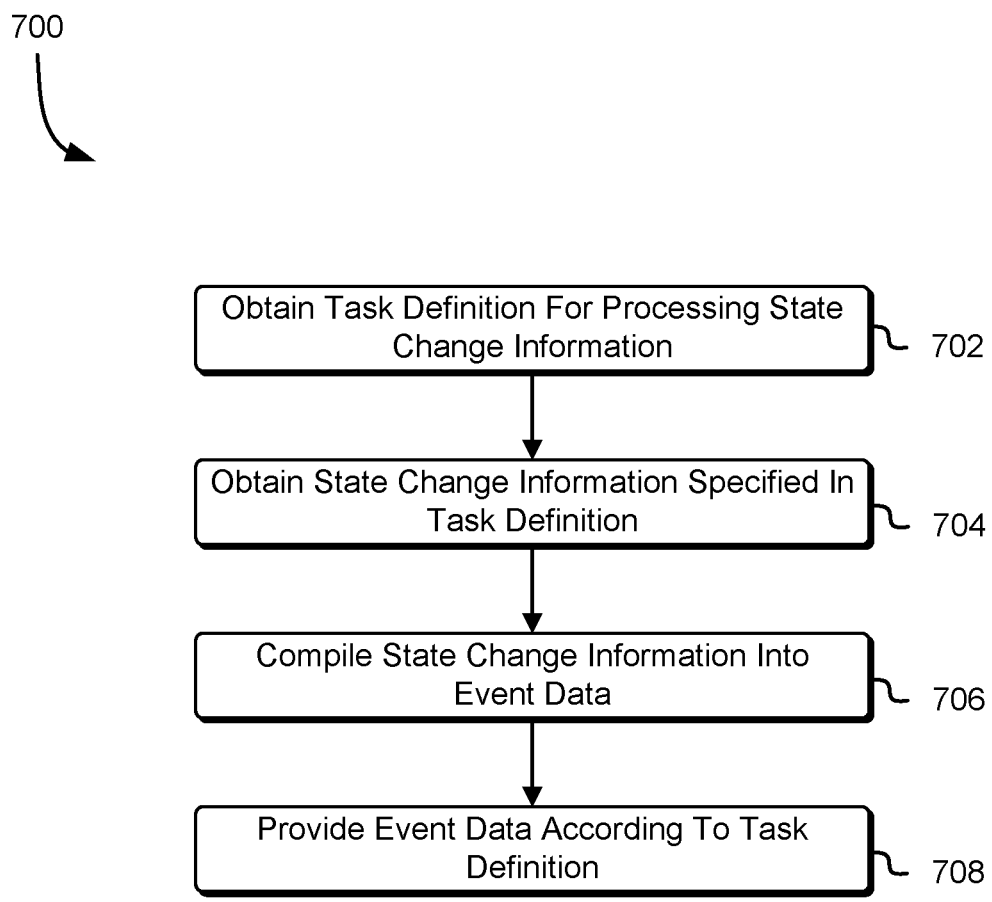
FIG. 7 shows an illustrative example of a process for compiling state change information in accordance with at least one embodiment.

As noted above, the event applier service may provision one or more worker systems to process the state change information obtained from the transaction journal. Each worker system may be responsible for processing state change information according to a task definition, generating event data based at least in part on the state change information identified in the task definition. Accordingly, FIG. 7 shows an illustrative example of a process 700 for compiling state change information into event data in accordance with at least one embodiment. The process 700 may be performed by each worker system provisioned by the event applier service to process state change information identified in its task definition.

In an embodiment, the event applier service identifies, based at least in part on state change information available in the state information datastore, one or more delivery methods for event data for one or more containers. The event applier service may provision a worker system corresponding to each of these identified delivery methods for the event data. The event applier service may provide a task definition to each of these worker systems to process state change information for containers associated with a particular delivery method for event data identified by the event applier service. Thus, a worker system may obtain 702, from the event applier service, a task definition for compiling state change information for one or more containers into event data that may be delivered to an entity according to the task definition.

A worker system of the event applier service may evaluate the task definition and access the state information datastore to obtain 704 state change information as specified in the task definition from the event applier service. The worker system may compile 706 the obtained state change information into event data. For instance, the worker system may evaluate the state change information to identify one or more events for the corresponding containers. As an illustrative example, the state change information may specify a state change corresponding to the initiation of a task, a state change corresponding to performance of one or more operations as part of the task, and a state change corresponding to the termination of the task (e.g., task has been completed, task has failed, etc.). The worker system may utilize these state changes to generate event data that denotes an event corresponding to the initialization of the task and to the termination of the task, along with timestamps that may be used to indicate when the event occurred. The event data may be encoded using a programmatic language usable by a computing resource monitoring service or other entity receiving the event data to evaluate data corresponding to these events.

The worker system may provide 708 the generated event data to an entity (e.g., computing resource monitoring service, customers, other services, etc.) according to the task definition from the event applier service. Additionally, the worker system may update the state change database of the event applier service to indicate successful processing of the state change information to generate the event data. For instance, the worker system may generate a new entry within the state change database to indicate successful processing of the state change information.

Figure 8:
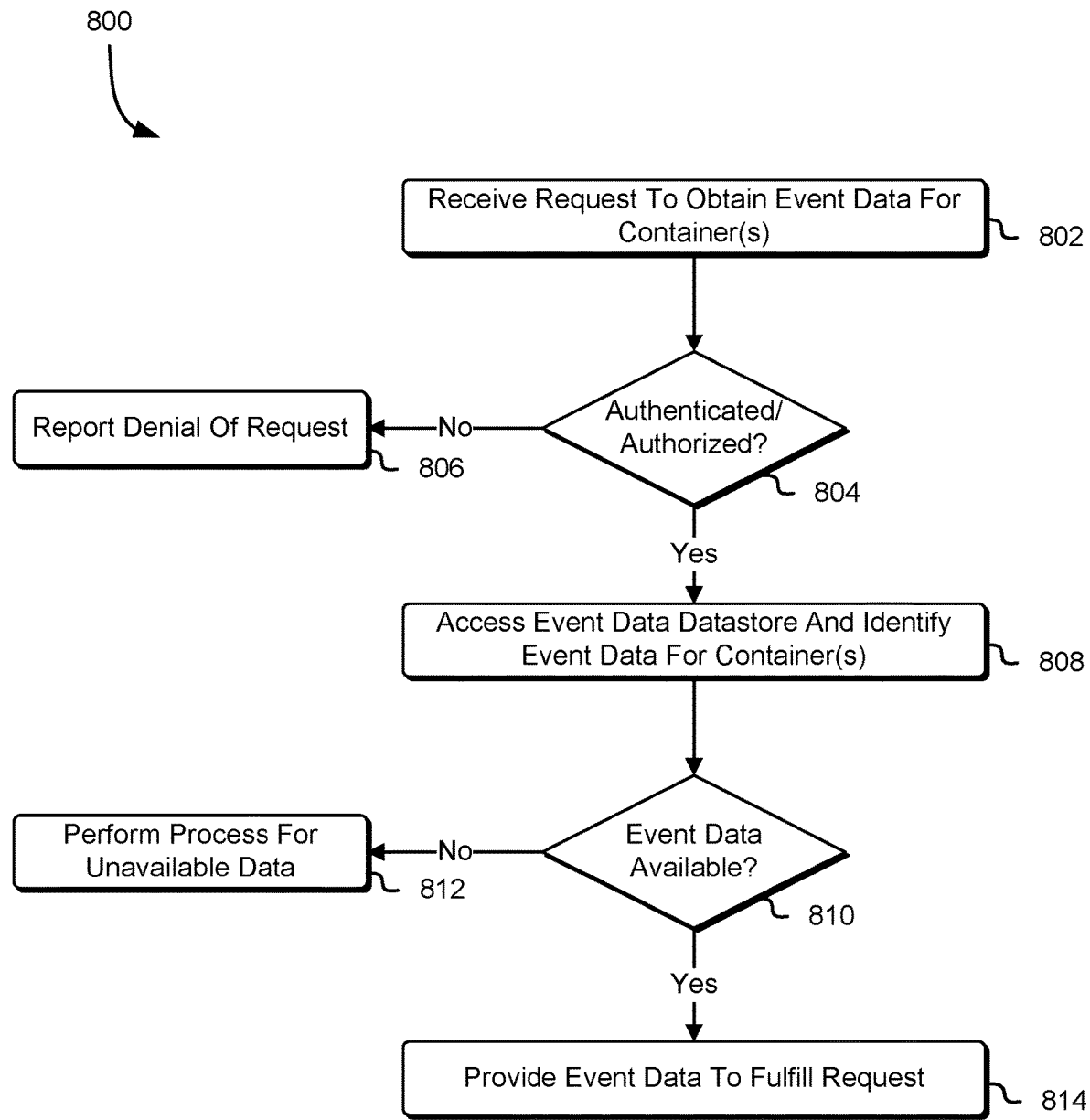
FIG. 8 shows an illustrative example of a process for providing event data in response to requests from customers to obtain event data for one or more containers in accordance with at least one embodiment.

As noted above, the computing resource service provider may provide a computing resource monitoring service to its customers. The computing resource monitoring service may provide event data to customers for their computing resources, including containers. The event data may include metrics corresponding to the customers' resources, as well as detailed information regarding events encountered by these resources. In some instances, the computing resource monitoring service may obtain event data from the event applier service, which may be used to fulfill customer requests to obtain event data for their containers. Accordingly, FIG. 8 shows an illustrative example of a process 800 for providing event data in response to requests from customers to obtain event data for one or more containers in accordance with at least one embodiment. The process 800 may be performed by the aforementioned computing resource monitoring service, which may process incoming requests from customers to obtain event data for their computing resources, including containers provisioned to perform various tasks on behalf of these customers.

At any time, the computing resource monitoring service may receive 802 a request from a customer or other entity to obtain event data for one or more containers. The request may specify an identifier for the customer or other entity, as well as a set of credentials or a representation of a set of credentials that may be used to authenticate the customer or other entity. The request may further specify one or more identifiers of containers for which event data is to be retrieved. In response to the request, the computing resource monitoring service may determine 804 whether the customer or other entity can be authenticated and, if so, whether the customer or other entity is authorized to access the requested event data. For instance, the computing resource monitoring service may utilize the provided customer identifier and credentials or representation of credentials to authenticate the customer or other entity. If the computing resource monitoring service is unable to authenticate the customer or other entity, the computing resource monitoring service may report 806 denial of the request. For instance, the computing resource monitoring service may transmit a notification to the customer or other entity to indicate that the request has been denied. If the customer or other entity is authenticated by the computing resource monitoring service, the computing resource monitoring service may identify one or more policies that may be applicable to the request. For instance, the one or more policies may specify whether the customer or other entity is authorized to access the event data requested. If the computing resource monitoring service determines, based at least in part on these one or more policies, that the customer or other entity is not authorized to access the requested event data, the computing resource monitoring service may report 806 denial of the request.

If the customer or other entity is authenticated and is authorized to access the requested event data, the computing resource monitoring service may access 808 its event data datastore to identify event data for the specified containers. The event data datastore may comprise event data obtained from one or more event applier services. For instance, an event applier service, through one or more worker systems, may transmit event data for one or more containers to the computing resource monitoring service, which may add this event data to the event data datastore. The computing resource monitoring service may maintain a database that includes entries for each container for which event data is available in the event data datastore. In response to the request from the customer or other entity, the computing resource monitoring service may evaluate this database to determine 810 whether event data is available for the specified containers.

If the computing resource monitoring service determines that there is no event data available to fulfill the request, the computing resource monitoring service may perform 812 a process for the unavailability of the requested event data. For instance, the computing resource monitoring service may transmit a notification to the customer or other entity to indicate that the requested event data is not available. Alternatively, the computing resource monitoring service may try to obtain the event data again at a later time, subject to a time-out period as specified by the customer or other entity. If the time-out period has elapsed, the computing resource monitoring service may inform the customer or other entity of the unavailability of the requested event data. If the computing resource monitoring service receives event data from the event applier service, the computing resource monitoring service may provide 814 the event data to the customer or other entity to fulfill the request.

Figure 9:
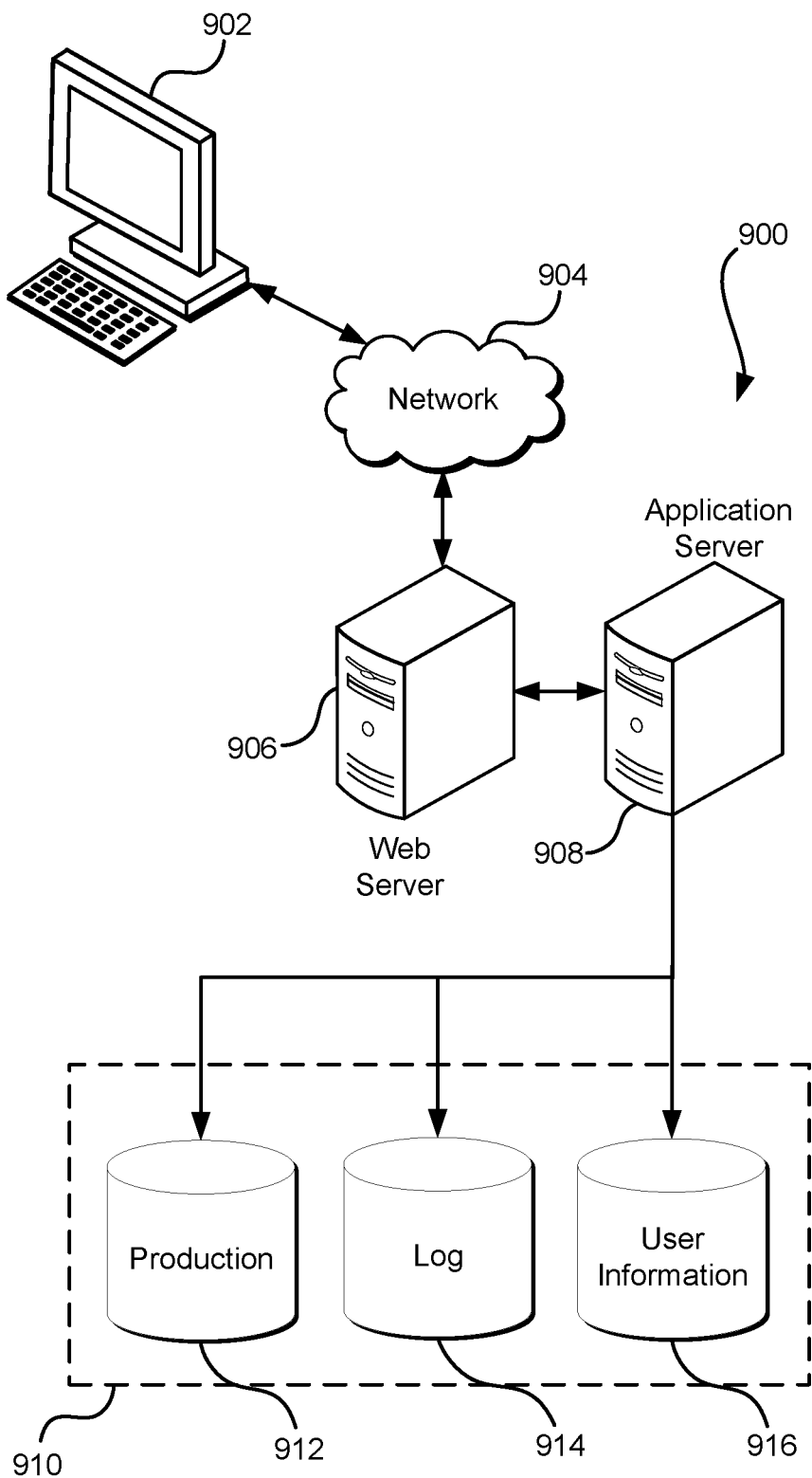
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining state change information for a plurality of containers operating on a computer system instance isolated from other processes executed on the computer system instance, the state change information specifying:
state transitions corresponding to operations performed by the plurality of containers; and
a set of version numbers;
adding the state change information to a sequence of state changes of the plurality of containers;
generating a set of task definitions based at least in part on the sequence of state changes of the plurality of containers, wherein a task definition of the set of task definitions specifies a subset of state change information to be compiled into event data by a worker system;
compiling, by one or more worker systems and based at least in part on the set of task definitions, the subset of the state change information into event data, the event data specifying events corresponding to the state transitions and to the operations performed by the plurality of containers, the state change information compiled into the event data based at least in part on the set of version numbers;
adding one or more entries to a database to specify availability of the event data of the plurality of containers;
obtaining a request to obtain event data of a container of the plurality of containers;
accessing the database to identify an entry corresponding to the container;
obtaining, based at least in part on the entry, the event data of the container; and
providing the event data of the container to fulfill the request.

2. The computer-implemented method of claim 1, further comprising:
obtaining, from the sequence of state changes of the plurality of containers, the state change information;
identifying, based at least in part on information specified in the state change information, one or more manners of providing the event data of the plurality of containers; and
provisioning, for the one or more manners of providing the event data, a worker system to obtain the state change information from the database and to compile the state change information into event data deliverable according to the one or more manners of providing the event data.

3. The computer-implemented method of claim 1, further comprising:
evaluating the state change information of the plurality of containers to identify a version number field corresponding to the state change information;
identifying, based at least in part on the sequence of state changes of the plurality of containers, a version number;
incrementing the version number to generate an incremented version number; and
appending the state change information to specify the incremented version number to cause the event data of the plurality of containers to specify the incremented version number.

4. The computer-implemented method of claim 1, wherein the sequence of state changes of the plurality of containers is stored in a transaction journal comprising a plurality of nodes, whereby each node of the plurality of nodes maintains a state change record that tracks the state change information.

5. The computer-implemented method of claim 1, further comprising identifying, based on customer identifiers specified in the state change information, methods for transmitting the event data.

6. A system, comprising:
one or more processors; and memory including instructions that, as a result of being executed by the one or more processors, cause the system to:
obtain, from a sequence of state changes of a plurality of computing resources operating on a computer system instance isolated from other processes executed on the computer system instance and comprising state change information provided by the plurality of computing resources, the state change information, whereby the state change information specifies:
state transitions corresponding to operations performed by the plurality of computing resources; and
a set of version numbers;
compile, using a set of worker systems, portions of state change information identified by a set of task definitions that identify respective portions of the state change information to be compiled by respective worker systems of the set of worker systems of the plurality of computing resources into event data based at least in part on operations specified in the state change information, the portions of state change information including the set of version numbers, the event data specifying events corresponding to the state transitions and to the operations performed by the plurality of computing resources; and
provide the event data of the plurality of computing resources.

7. The system of claim 6, wherein the instructions further cause the system to:
access a processing database to obtain a lock to process the state change information without interference from other systems; and
as a result of obtaining the lock, access the sequence of state changes to obtain the state change information.

8. The system of claim 6, wherein the sequence of state changes of the plurality of computing resources are stored within a transaction journal comprising a set of state change records to track the state change information within the sequence of state changes.

9. The system of claim 6, wherein the instructions that cause the system to compile the state change information of the plurality of computing resources into the event data further cause the system to provision a set of worker systems to convert operations of the plurality of computing resources specified in the state change information into a set of events of the plurality of computing resources.

10. The system of claim 6, wherein the instructions further cause the system to:
evaluate the sequence of state changes of the plurality of computing resources to determine that the state change information of the plurality of computing resources is available;
access the sequence of state changes to obtain the state change information; and
monitor the sequence of state changes of the computing resource to identify new state change information.

11. The system of claim 6, wherein the instructions further cause the system to:
identify, from the state change information, a delivery method to deliver event data of at least one computing resource of the plurality of computing resources;
obtain other state change information that has the delivery method; and
compile at least some of the state change information corresponding to the delivery method with the other state change information to generate second event data, the second event data being deliverable according to the delivery method.

12. The system of claim 6, wherein the instructions further cause the system to update a database to indicate that the state change information has been processed, the database distinguishing processed state change information from new state change information available via the sequence of state changes.

13. A non-transitory computer-readable storage medium storing thereon executable instructions that, as a result of execution by one or more processors of a computer system, cause the computer system to at least:
as a result of determining that state change information maintained in a transaction journal is absent from a state change database, update the state change database with the state change information from the transaction journal, the state change information specifying state transitions corresponding to operations performed by a plurality of computing resources;
obtain, from a sequence of state changes maintained by the state change database, the state change information of the plurality of computing resources;
cause one or more worker system to generate, based at least in part on operations performed using the plurality of computing resources specified in the state change information and one or more task definitions identifying subsets of state change information determined based at least in part on the sequence of state changes, event data of the plurality of computing resources; and
provide the event data.

14. The non-transitory computer-readable storage medium of claim 13, wherein the executable instructions that cause the computer system to provide the event data further cause the computer system to transmit the event data to a computing resource monitoring service that provides the event data in response to requests to obtain the event data.

15. The non-transitory computer-readable storage medium of claim 13, wherein the executable instructions that cause the computer system to generate the event data of the plurality of computing resources further cause the computer system to:
identify, based at least in part on the state change information, a plurality of delivery methods whereby each delivery method of the plurality of delivery methods corresponds to at least one computing resource of the plurality of computing resources; and
for each delivery method of the plurality of delivery methods:
provision a worker system to compile state change information of the at least one computing resource to generate event data of the at least one computing resource; and
transmit the event data of the at least one computing resource according to the delivery method.

16. The non-transitory computer-readable storage medium of claim 13, wherein the executable instructions that cause the computer system to obtain the state change information of the plurality of computing resources further include instructions that cause the computer system to:
evaluate the sequence of state changes of the plurality of computing resources to determine that the state change information is available; and
monitor the sequence of state changes for the computing resource to identify new state change information.

17. The non-transitory computer-readable storage medium of claim 13, wherein:

the state change information specifies a set of version numbers, the set of version numbers denoting an ordering of the operations of the plurality of computing resources; and the executable instructions further cause the computer system to append the event data with the set of version numbers to perform ordering of the event data.

18. The non-transitory computer-readable storage medium of claim 13, wherein the executable instructions further cause the computer system to:

access a processing database to determine that a lock is available to process the state change information from the sequence of state changes without interference from other computer systems;

update the processing database to indicate that the lock has been obtained; and access the sequence of state changes to obtain the state change information.

19. The non-transitory computer-readable storage medium of claim 13, wherein the transaction journal comprises a plurality of state change records that is used to track the state change information within the sequence of state changes.

20. The non-transitory computer-readable storage medium of claim 19, wherein the sequence of state changes of the plurality of computing resources are replicated within the plurality of state change records.

* * * * *